July 29, 1969
D. SAGES
3,458,298
WATER GAS PROCESS
Filed Sept. 16, 1963
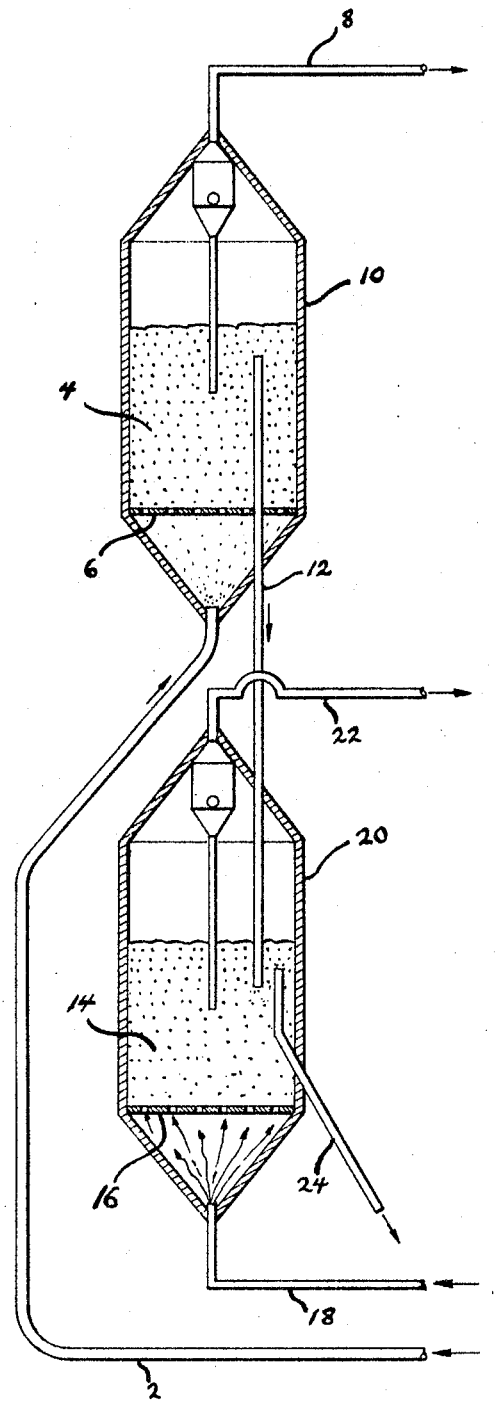
INVENTOR
DANYEL SAGES
BY Ross L. Foertmeyer
ATTORNEY

United States Patent Office 3,458,298
Patented July 29, 1969

3,458,298
WATER GAS PROCESS
Danyel Sages, Stamford, Conn., assignor to The Lummus Company, New York, N.Y., a corporation of Delaware
Filed Sept. 16, 1963, Ser. No. 308,995
Int. Cl. C10j 3/00; C10b 53/06
U.S. Cl. 48—197
5 Claims

ABSTRACT OF THE DISCLOSURE

Production of water gas from oil shale having an ash fusion temperature above 2100° F., involving burning 40–60% of the combustibles in a first fluidized bed at 2000–2500° F., and contacting the burned shale with steam at 1600–1800° F. in a second fluidized bed, and discarding the spent shale.

This invention relates to the utilization of oil shale. More particularly, this invention relates to the employment of oil shale for generation of water gas.

Water gas, which is the term given the product mixture resulting from gasification of carbon with steam at elevated temperatures according to the equation:

$$C + H_2O \rightarrow H_2 + CO$$

has been extensively employed as a large scale source of hydrogen for industrial purposes, e.g., for ammonia synthesis. Generally speaking, the sequence for producing industrial hydrogen involves first gasifying carbonaceous matter like coke with steam, followed ultimately by subjecting the gaseous product mixture to the water gas shift reaction: $CO + H_2O \rightarrow H_2 + CO_2$. The $CO_2$, $H_2O$, and if desired the little CO remaining are removed, leaving hydrogen of adequate purity for industrial use in ammonia synthesis and others.

Unfortunately the water gas reaction is highly endothermic. As a result a source of heat is required for the reaction itself and to maintain reaction temperatures above about 1600° F. One proposed solution to this problem involves effecting partial combustion of the carbonaceous matter with oxygen to carbon monoxide, an exothermic reaction, simultaneous with the endothermic water gas reaction. The gasiform product, known as synthesis gas, is convertible to hydrogen of industrial purity in the same manner as water gas. However, since this expedient necessarily requires a source of oxygen, an air liquefaction and separation plant must usually be made part of the system.

Another expedient suggested by the art for overcoming the endothermic nature of the water gas reaction involves cyclically heating coke to above gasification temperatures, by combustion with air, then gasifying with steam, then heating, etc. By this procedure only part of the coke can be converted to water gas, a somewhat undesirable expedient when employing a relatively expensive source of carbon like coke. On the other hand, relatively low value carbonaceous materials do exist, namely, oil shale.

Oil shale has been extensively investigated by workers in the art but mostly for ways to recover mineral oil (shale oil) therefrom. Production of synthesis gas or water gas has even been suggested by workers as part of their oil recovery systems. Unfortunately, the carbonaceous content and calorific value of oil shale is so low that recovery of both oil and gaseous products frequently makes employment of extraneous fuel necessary for operation of the process. Employment of an extraneous fuel like coal or coke is self-defeating since shale itself has fuel value and, even worse, the extraneous fuel would ordinarily have to be shipped in from distant sources.

Moreover, most such integrated systems suggest producing synthesis gas rather than water gas. For such oil shale treatment systems the capital cost and operating expense of an oxygen plant must be included within the cost structure.

Even without an oxygen plant and the expense of shipping in extraneous fuel, integrated systems for treating oil shale suffer from serious disadvantages by virtue of their very integration. Shale oil is almost inevitably the principal product, and fuel gases are the chief by-products. Water gas or synthesis gas is a minor product, at best. Thus, while hydrogen has a substantial demand for ammonia synthesis and the like, the demand for hydrogen alone cannot justify construction of an integrated plant for converting oil shale into usable products.

In short, direct production solely of water gas from oil shale would be desirable.

The principal object of the invention is to provide a process employing oil shale for the production of water gas.

Another object of this invention is to provide a fluidized bed process for producing water gas from oil shale.

Still further objects and the advantages of the invention will be apparent from the description which follows.

Briefly stated the instant invention comprises combusting raw oil shale under fluidized bed conditions at an elevated temperature in the range of 2000°–2500° F., depending upon the melting point of the shale ash. However, only 40–60% of the combustible matter present in the raw shale is burned off. The partial combustion serves to raise the shale to the desirably high temperature and at the same time leaves sufficient carbon in the shale coke for subsequent gasification by steam to form water gas. The hot shale coke resulting from the combustion is withdrawn from the fluidized combustion bed and passed to a fluidized bed water gas generator. Superheated steam fluidizes the shale coke and gasifies the carbon of the shale coke to form a gaseous product mixture of $H_2O$, CO, $H_2$. The steam itself would ordinarily be generated in a boiler heated by the hot combustion product of the fluidized shale combustion.

For a further understanding of the invention, reference is hereby made to the attached drawing diagrammatically illustrating a preferred arrangement of apparatus for carrying out the process of the instant invention.

The apparatus comprises a shale combustor 10, a water gas generator 20 and a steam boiler (not shown). Raw shale entrained in combustion air enters the system through line 2 and is blown up into a fluidized bed 4 maintained above perforated grid 6 inside combustor vessel 10. Combustion of carbonaceous matter in the shale maintains a bed temperature in the range of 2000°–2500° F., the exact temperature depending upon the melting point of the shale ash. Desirably the combustion temperature of fluidized bed 4 is maintained about 50–150° F. below the fusion point. An important feature of the instant invention is employment of oil shales having an ash fusion temperature exceeding about 2100° F. The combustion gases passing overhead of fluidized bed 4 are withdrawn through oultet line 8 and passed to a steam boiler (not shown) for generating the steam required for the process.

The combustion conditions in fluidized bed 4 and in particular the residence time of the shale is adjusted so that the shale has from 40-60% of the combustible present in the raw shale burned off in fluidized bed 4. As a result, the combusted shale withdrawn from fluidized bed 4 through down comer or take-off pipe 12 still retains a substantial percentage of the carbon initially present in the shale. The free or non-carbonate carbon content of this shale coke may be up to about 10% by weight of the coke. Moreover, by virtue of the high combustion temperatures to which the shale have been subjected, the shale coke passed to water gas generator 20 has substantially a zero volatile content. Thus the shale coke serves as a relatively pure source of carbon for the water gas reaction.

The shale coke passes from take-off pipe 12 to a fluidized bed 14 resting on grid 16. Superheated steam entering from line 18 fluidizes the shale coke in bed 14. A substantial portion of the fluidizing steam reacts with carbon of the shale coke to produce the desired water gas, simultaneously cooling the shale coke. Removal of heat by the endothermic water gas reaction balances the sensible heat of the hot coke to establish a temperature within the range of about 1600° F.–1800° F. for fluidized bed 14. Relative to the available carbon content in the shale coke an excess of steam is employed. In particular about 1.2 to 2 mols of steam per mol of free carbon is passed through fluidized bed 14. The product gas from water gas generator 20 is removed through line 22 for subsequent utilization such as for example ammonia synthesis. Spent shale or shale ash is removed from fluidized bed 14 through draw-off line 24.

The practice of the instant invention takes full advantage of potential interrelationships. Mention has already been made of how the hot combustion gases from line 8 would ordinarily be passed to a steam boiler for generation of process steam. Similarly, the spent shale ash withdrawn through outlet line 24 at the elevated temperature of 1600–1800° F. would ordinarily be passed in direct or indirect heat exchange contact with low pressure steam to raise the temperature of the steam nearly to reaction temperatures, the steam then being passed into water gas generator 20. Thereafter the sensible heat still in the shale ash can be imparted to the combustion air for shale combustor 10.

Operation according to the practice of the instant invention converts into actual advantages certain characteristics of oil shale which are ordinarily considered detrimental. In particular the high ash content of oil shale, amounting to 75-90% of the raw shale, makes once-through operation possible. In effect, the ash content in the oil shale is heated to about 2000° F. by combustion in fluidized bed 4. Subsequently the ash content is cooled at least two hundred degrees by the endothermic water gas reaction in fluidized bed 14. The ash content of the shale actually serves as source for the heat of reaction needed to gasify the carbon content of the shale coke by the water gas reaction. Moreover, since the sensible heat of the combustion gases are largely recovered in a steam boiler, and since much of the sensible heat in the spent shale discharged from bed 14 can also be recovered, e.g., by preheating process steam, the process as a whole operates with relatively high heat efficiency.

The need to maintain a several hundred degree temperature difference between combustion bed 4 and water gas generation bed 14 is what sets the minimum fusion point requirement for shale at about 2100° F. Combustion in fluidized bed 4 at temperatures below about 2000° F. detrimentally affects the water gas reaction in fluidized bed 14 because the water gas reaction requires a temperature of at least about 1600° F. and proceeds more rapidly at higher temperatures. In effect, supplying lower temperature shale coke from fluidized bed 4 sharply reduced the percentage of the available carbon and steam converted into water gas inside fluidized bed 14.

For a further understanding of the invention, reference is hereby made to the following specific example.

In an apparatus constructed according to the manner illustrated by the drawing, a 20 gal./ton oil shale was treated. The oil shale which had a calorific value of 1800 B.t.u./lb. was rough ground to a size distribution range of ¼″ to 100 mesh. The fusion temperature of the shale ash was 2300° F.

The raw shale, preheated against flue gases to 150° F., was suspended in air, preheated to 700° F. against shale ash. The feed rate was 5000 tons of shale per day and 50,000 s.c.f. per minute. The suspension of shale in air was fed to a fluidized bed 15 feet in diameter and 20 feet high maintained inside combustor 10. The combustion in fluidized bed 4 operated at a bed temperature of 2200° F., and burned off about 55% of the combustible matter present in the raw shale. The combusted shale removed from fluidized bed 4 was a shale coke having about 8% free carbon (non-carbon carbon).

The hot effluent combustion gases removed through line 8 contained an amount of suspended fly ash of about 10% by weight of the feed shale. These hot flue gases (2200° F.) were employed to generate 500,000 pounds per hour of steam.

The shale coke (4500 tons/day) at 2200° F. was fed to water gas generator 20. About 1000 pounds of steam per minute preheated to a temperature of about 1200° F. against outgoing shale ash, fluidized the shale coke. Fluidized bed 14, which was 15 feet in diameter and about 15 feet high, operated at a temperature of 1700° F. Spent shale was withdrawn through draw-off 24 at the rate of about 3600 tons per day. About 600 tons of the shale ash per day was entrained in the water gas product removed by way of line 22. The spent shale assayed about 2% free carbon. The spent shale was cooled against process steam and then against combustion air before being discarded.

The water gas product removed through line 22 was substantially free of hydrocarbon gases and vapors. It was constituted of about 26 tons per hour of carbon monoxide, 3700 lbs./hr. by hydrogen and 13 tons/hr. of steam. After removal of the suspended fly ash this product gas was subjected to the water gas shift reaction (in the presence of additional steam) to produce about 3700 pounds per hour of additional hydrogen. The carbon dioxide and steam were removed, then the hydrogen was further purified and employed in the synthesis of ammonia.

What is claimed is:

1. A method for producing water gas from oil shale having an ash fusion temperature above about 2100° F. comprising: feeding finely divided oil shale to a fluidized bed maintained at a temperature in the range of 2000°–2500° F. by combustion with air employed as the fluidizing medium, whereby from 40-60% of the combustible content of the oil shale is burned; employing the hot combustion gases for generation of process steam; passing the hot combusted shale to a second fluidized bed wherein the combusted shale is contacted with superheated steam as the fluidizing medium, said steam reacting with the carbon content of combusted shale coke at reaction temperatures in the range of about 1600°–1800° F. thereby gasifying the carbon in said combusted shale; removing and discarding spent shale ash from said second fluidized bed; and recovering the water gas product.

2. The process of claim 1 wherein steam in excess of reaction requirements is supplied to said second fluidized bed, the steam to carbon molar ratio ranging from 1.2 to 1 to 2 to 1.

3. The process of claim 1 wherein said first named fluidized bed is maintained at a combustion temperature of approximately 50–150° F. below the fusion point of the shale ash.

4. The process of claim 3 wherein the size distribution range of the finely divided shale ranges from about ¼″ to about 100 mesh.

5. The process of claim 1 wherein the spent shale ash prior to being discarded is passed in indirect heat transfer relationship with the steam before the steam is introduced into the fluidized bed.

References Cited
UNITED STATES PATENTS 2,579,398   12/1951   Roetheli _____ 48—202

JOSEPH SCOVRONEK, Primary Examiner

U.S. Cl. X.R.

48—202, 204, 206